(12) United States Patent
Bainvel et al.

(10) Patent No.: US 10,118,234 B2
(45) Date of Patent: Nov. 6, 2018

(54) PORTABLE DRILLING AND/OR BORING MACHINE

(71) Applicant: Fives Machining, Saint Laurent les tours (FR)

(72) Inventors: Jean-Marc Bainvel, Fontenay aux Roses (FR); Jean-François Sartori, Biars sur Cere (FR)

(73) Assignee: Fives Machining, Saint-Laurent-les-Tours (FR)

( * ) Notice: Subject to any disclaimer, the term of this patent is extended or adjusted under 35 U.S.C. 154(b) by 18 days.

(21) Appl. No.: 15/318,789

(22) PCT Filed: Jun. 1, 2015

(86) PCT No.: PCT/IB2015/054151
§ 371 (c)(1),
(2) Date: Jan. 24, 2017

(87) PCT Pub. No.: WO2015/193760
PCT Pub. Date: Dec. 23, 2015

(65) Prior Publication Data
US 2017/0173705 A1    Jun. 22, 2017

(30) Foreign Application Priority Data
Jun. 17, 2014    (FR) .................................... 14 55534

(51) Int. Cl.
*B23B 49/02*    (2006.01)

(52) U.S. Cl.
CPC ............ *B23B 49/023* (2013.01); *B23B 49/02* (2013.01); *B23B 2215/04* (2013.01);
(Continued)

(58) Field of Classification Search
CPC ... B23B 49/023; B23B 49/02; B23B 2215/04; Y10T 408/56245; Y10T 408/5621; Y10T 279/17529
See application file for complete search history.

(56) References Cited

U.S. PATENT DOCUMENTS 2,315,937 A * 4/1943 Cramer ................. B23B 31/185
    279/107
2,909,949 A * 10/1959 Winslow ............. B23B 51/0054
    408/10

(Continued)

FOREIGN PATENT DOCUMENTS

EP    0761351 A1    3/1997
EP    1114685 A2    7/2001

OTHER PUBLICATIONS

French Patent Application No. 14 55534, Rapport de Recherche Preliminaire, dated Feb. 13, 2015, 3 pages.
(Continued)

*Primary Examiner* — Daniel Howell
*Assistant Examiner* — Yasir Diab
(74) *Attorney, Agent, or Firm* — Soquel Group LLC

(57) ABSTRACT

A portable drilling and/or boring machine, for workpieces, in particular workpieces that make up aeroplane structures, such as airframes, wings, cabin, etc., the machine including a jig busing for guiding a machining tool, an expansible clip for blocking the jig bushing in an opening of a screen positioned on and secured to the workpiece, the screen constituting a drilling jig, and means for moving the expansible clip in order to clamp and unclamp the jig bushing and secure the machine relative to the screen, the means for moving the expansible clip relative to the jig bushing including an electric motor, the torque and position of which are controlled.

10 Claims, 3 Drawing Sheets

(52) U.S. Cl.
CPC . *B23B 2260/062* (2013.01); *Y10T 279/17529* (2015.01); *Y10T 408/5621* (2015.01); *Y10T 408/56245* (2015.01)

(56) References Cited

U.S. PATENT DOCUMENTS

| | | | | |
|---|---|---|---|---|
| 3,201,809 A | * | 8/1965 | Neuschotz | B23G 7/00 269/270 |
| 4,536,688 A | * | 8/1985 | Roger | B23B 45/001 318/490 |
| 4,689,534 A | * | 8/1987 | Gerber | H01H 9/06 310/47 |
| 4,958,967 A | * | 9/1990 | Adachi | B23Q 1/70 408/129 |
| 5,014,793 A | * | 5/1991 | Germanton | B25B 21/00 173/181 |
| 5,062,746 A | | 11/1991 | Deremo | |
| 5,273,295 A | * | 12/1993 | Lieberman | B23B 31/1207 279/126 |
| 5,584,618 A | * | 12/1996 | Blankenship | B23B 31/22 408/1 R |
| 5,628,592 A | * | 5/1997 | Ringer | B23B 49/02 408/110 |
| 2004/0182175 A1 | * | 9/2004 | Day | B25B 23/147 73/862.21 |
| 2008/0260485 A1 | * | 10/2008 | Jaillon | B23B 35/005 409/232 |
| 2010/0043194 A1 | * | 2/2010 | Houis | B21J 15/14 29/428 |
| 2011/0243676 A1 | * | 10/2011 | Marguet | B21J 15/14 408/72 R |

OTHER PUBLICATIONS

PCT Patent Application No. PCT/IB2015/054151, International Search Report, dated Sep. 15, 2015, 4 pages.

* cited by examiner

PORTABLE DRILLING AND/OR BORING MACHINE

CROSS REFERENCE TO RELATED APPLICATIONS

This application claims priority under 35 USC § 371 of PCT Patent Application No. PCT/IB2015/054151 entitled PORTABLE DRILLING AND/OR BORING MACHINE, filed on Jun. 1, 2015. PCT Patent Application No. PCT/IB2015/054151 claims priority of French Patent Application No. 1455534 filed on Jun. 17, 2014.

FIELD OF THE INVENTION

The invention relates to a portable drilling and/or boring machine, in particular for pieces making up airplane structures, such as airframes, wings, cabin.

These machines are primarily used by operators as portable machines, but can be carried and positioned on structures by robots.

BACKGROUND OF THE INVENTION

Most drilling machines are equipped with pneumatic motors providing the rotation of the drill spindle, as well as the various forward movements of the spindle. A machine of this type is shown by FR 2,680,329, which provides a pneumatic motor for rotating the spindle, and an electric motor for forward movements requiring less power.

The machine is positioned precisely, on a workpiece, using a drilling screen, forming a jig, the screen being positioned and fastened precisely on the piece. The machine includes a jig bushing for guiding the machining tool, and means for gripping and locking the jig bushing in an opening of the screen, to fasten the machine on the screen.

The fastening of the machine on an "airplane" positioning screen is advantageously obtained using a fastening device commonly referred to as "Concentric Collet" comprising an expansible clip engaged in the opening of the screen to provide clamping of the jig bushing and locking in the opening by a pneumatic-mechanical system of the jack and lever arm type.

The clamping force of the fastening device, in particular of the Concentric Collet type, is an important parameter in the quality of the drilling operation to be performed.

The clamping forces of the fastening device cause a compensating force along the drilling axis. The value of this force must be limited as closely as possible in order to prevent permanent micro-deformations of the outer skin of the aircraft.

It is desirable to be able to adapt the clamping force without altering the mechanical configuration of the machine, which is difficult with the pneumatic jack.

It is further desirable to eliminate, or at least limit, problems during the loosening phase. In particular, in the case of a corner system like those used in a fastening device of the "Concentric Collet" type, jamming may occur.

SUMMARY OF THE DESCRIPTION

The invention above all aims at providing a high-performing portable drilling and/or boring machine that is more practical to use.

The invention deals with a portable drilling and/or boring machine, for workpieces, in particular workpieces that make up airplane structures, such as airframes, wings, cabin, includes:

a jig bushing for guiding a machining tool,
an expansible clip for blocking the jig bushing in an opening of the screen positioned on and secured to the workpiece, said screen constituting a drilling jig,
a means for moving the expansible clip in order to clamp and unclamp the jig bushing and secure the machine relative to the screen, wherein the means for moving the expansible clip relative to the jig bushing comprises an electric motor whereof the torque and position are controlled.

Advantageously, the machine comprises a screw-nut system for converting the rotational movement of the shaft of the motor into a linear movement of the clamping clip. The machine is preferably equipped with damping springs at the nut, providing flexibility for the increasing torque on the motor during the clamping and unclamping phases.

The machine may comprise at least one electronic board on which a control module and a power module of the machine are installed.

Advantageously, the machine comprises a Man-Machine interface integrated on the machine making it possible to program the torque of the motor or the clamping force of the clip.

The electric motor is generally of the brushless type.

BRIEF DESCRIPTION OF THE DRAWINGS

Aside from the arrangements described above, the invention consists of a certain number of other arrangements that will be more explicitly discussed below relative to one non-limiting example embodiment described in reference to the appended drawings. In this drawing.

DETAILED DESCRIPTION

Figure 1:
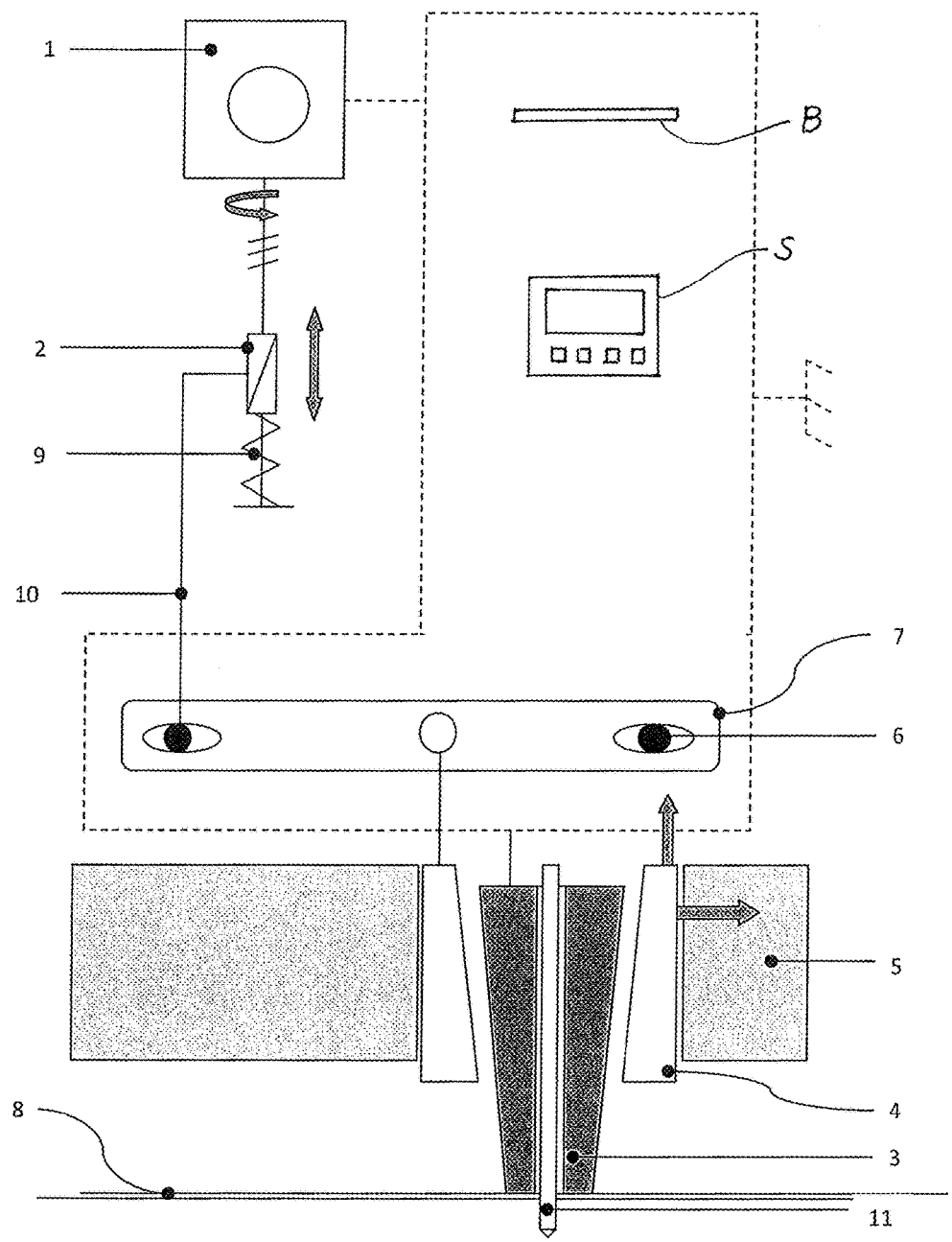
FIG. 1 is a diagrammatic view, part in elevation and part in vertical section, of a machine according to the invention after a drilling operation.
Figure 2:
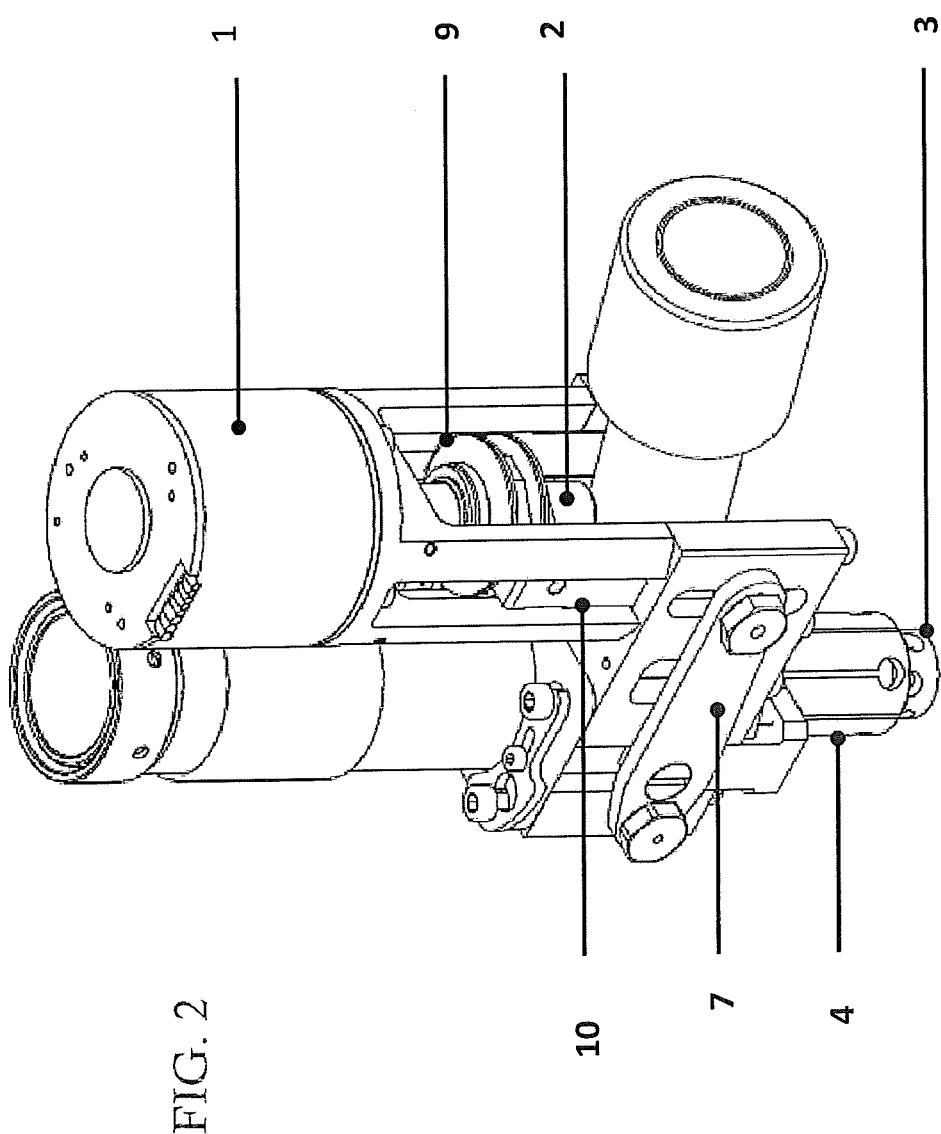
FIG. 2 is a right front three-quarters perspective view of the machine.
Figure 3:
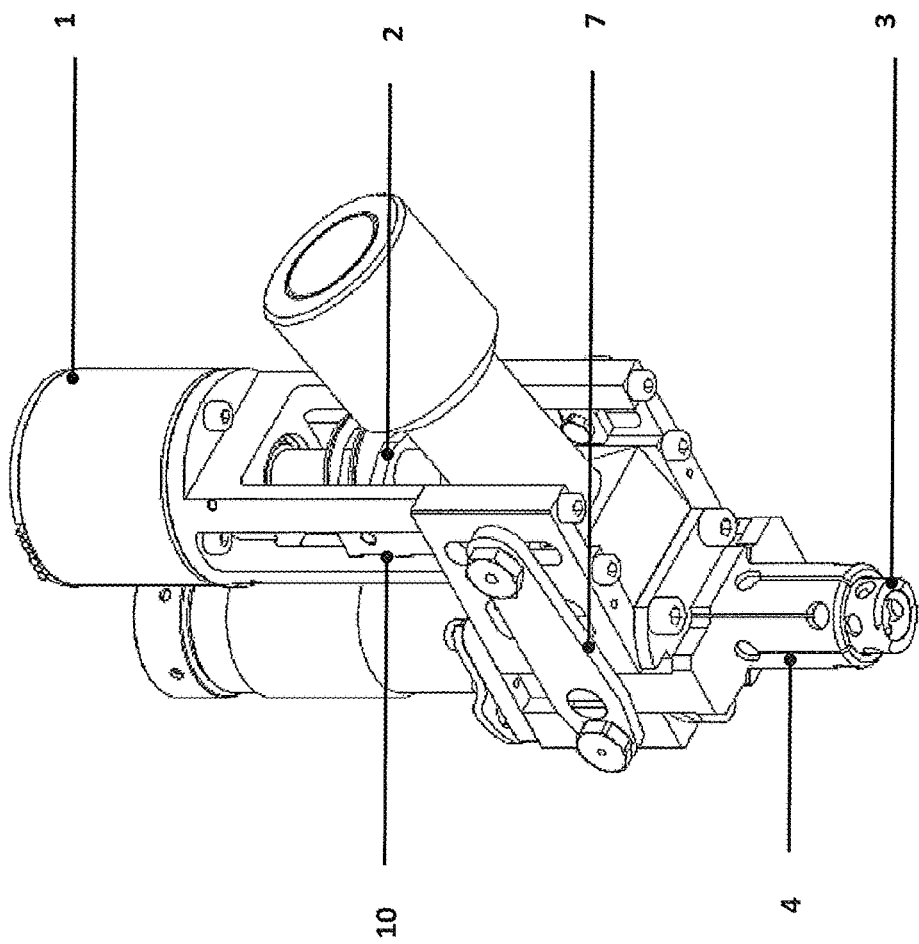
FIG. 3 is a bottom perspective view of the machine.

In reference to the drawings, one can see a portable drilling and/or boring machine, with a casing diagrammatically shown by an outline in dashed lines, for parts to be machined, in particular parts making up airplane structures, such as airframes, wings, cabin. According to the illustration of FIG. 1, the workpiece 8 is made up of a wall, or skin, of an airplane airframe.

The machine includes a jig bushing 3 to guide a machining tool 11. The outer surface of the jig bushing is frusto-conical, with a section that increases from bottom to top. The jig bushing 3 is connected to the machine.

The machine also includes an expansible clip 4, constituting a jaw, for blocking the jig bushing 3 in an opening of a screen 5 positioned and fastened on the workpiece 8. The screen 5 constitutes a drilling jig. The clip 4 includes at least two, preferably at least three, corners having an inner surface able to hug the convex conical or frustoconical surface of the jig bushing 3, and a cylindrical outer surface able to press against the cylindrical inner surface of the opening of the screen 5, when the clip 4 is engaged in this opening.

A means for moving the expansible clip 4 relative to the jig bushing 3 is provided to see to the clamping and unclamping of the jig bushing and the fastening of the machine relative to the screen 5. The movement of the clip 4 is done in vertical translation. The rising of the clip 4 causes its concave conical or frustoconical inner surface to be pressed against the jig bushing 3 with a clamping force against the inner surface of the opening of the screen, as diagrammatically shown by a horizontal arrow in FIG. 1.

The means for moving the clip 4 is made up of an electric motor 1 whereof the torque and position are controlled. The electric motor is preferably of the brushless type. The body of the motor 1 is fastened to the casing of the machine.

The machine comprises a screw-nut system 2 for converting the rotating movement of the shaft of the motor 1 into a linear movement of the clamping clip. The vertical translational linear movement of the nut is transmitted by a vertical stirrup 10 to an articulation provided at an end of a substantially horizontal connecting rod 7, articulated at its other end on a fixed point 6 of the machine. A vertical connection is provided between an articulation point, provided on the connecting rod between its ends, and the clip 4.

The machine is equipped with damping springs 9 at the nut providing increased flexibility of the torque on the motor during the clamping and unclamping phases.

The machine comprises a control module and a power module that are on board the drilling machine and installed at least on an electronic board B housed in the casing of the machine.

Advantageously, the machine comprises a Man-Machine interface S integrated on the machine allowing programming of the torque of the motor or the clamping force of the Concentric Collet.

A spindle is mounted rotating in the casing of the machine. This spindle can be translated, in the direction of its geometric axis, following a forward or backward movement through a mechanism that is not shown.

The use and operation of the machine are as follows.

In the initial position, the stirrup 10 is in the high position, as well as the clip 4. The clip 4/jig bushing 3 assembly is expanded. As a result, the operator cannot position the jig bushing 3 and the clip 4 within an opening of the screen 5.

When the machine is powered on, the operator presses on a clamping control button and keeps it pushed in. This operation will activate the motor 1, which causes the motor 1 to rotate in the direction that ensures the lowering of the nut 2 and the strep 10. The connecting rod 7 will lower while rotating in the counterclockwise direction around the fixed point 6. This results in unclamping the clip 4 and allowing the operator to position the jig bushing 3 in a selected opening of the screen 5, by pressing on the piece 8.

When this operation has been done, the operator releases the clamping button. The rotation direction of the motor 1 will then be reversed to allow the expansible clip 4 to rise. The connecting rod 7 will rotate in the clockwise direction around the fixed point 6, raising the clip 4, the frustoconical inner surface of which will press against, and clamp, the frustoconical outer surface of the jig bushing. The outer surface of the clip is pressed against the wall of the opening of the screen. The machine is then blocked on the screen 5.

Once the programmed torque of the motor 1 is reached, the motor stops while remaining supplied with current and maintaining the exerted torque and the force on the connecting rod 7 and the jig bushing 4. The management of the motor 1 is preferably done by measuring the intensity of the current traversing it, and is done by the electronic board B. The operator stops pressing the clamping button. The motor 1 remains powered on and is kept in its position. The operator can release the machine, which remains secured to the screen 5.

The machining operation, in particular drilling, is next controlled by actuating an appropriate button to cause the tool 11 to be lowered.

When the machining operation is complete, the operator commands the lowering of the stirrup 10 and the rotation of the connecting rod 7 in the counterclockwise direction around the point 6 in order to lower the clip 6 and unclamp the jig bushing 3. The clamping torque of the motor is advantageously programmed to be greater than the clamping torque in order to overcome any stray jamming forces.

For safety reasons, the position of the motor, i.e., the angular position of the shaft of the motor, is controlled. If the motor continues to rotate when the assigned position is reached, the program is provided to command stopping of the cycle.

If the power supply is cut, the system must not unclamp. The springs 9, in particular made up of Belleville washers, and the reversibility of the screw-nut system make it possible to meet this need.

The invention provides many advantages, including the following:

The clamping is obtained by an electric motor whereof the torque and the position are controlled.

The clamping values can be programmed directly on control module.

The adjustment ranges are expansive; the user can program more appropriate clamping values on screens and limit deformations on the outer skin of the airplane.

The unclamping (which requires a force greater than the clamping) is reliabilized because the forces are controlled by the board.

Greater security by controlling the position of the driving rotor by stopping the cycle if unclamping is observed.

For the user, this results in:

Improved quality of the operations while limiting clamping to what is strictly necessary (lower deformation of the skins)

Modification of the clamping is easy and obtained by program

Reliability of unclamping in order to avoid jamming

The invention claimed is:

1. A portable drilling and/or boring machine for workpieces, comprising:
   a jig bushing for guiding a machining tool;
   an expansible clip for blocking the jig bushing in an opening of a screen positioned on and secured to the workpiece, said screen constituting a drilling jig; and
   means for moving the expansible clip in order to clamp and unclamp the jig bushing and secure the machine relative to the screen, the means for moving the expansible clip comprising an electric motor whereof the torque and position are controlled.

2. The machine according to claim 1, further comprising a screw-nut system for converting the rotational movement of the shaft of the motor into a linear movement of the clamping expansible clip.

3. The machine according to claim 2, equipped with damping springs at the nut, providing flexibility for the increasing torque on the motor during the clamping and unclamping phases.

4. The machine according to claim 1, further comprising at least one electronic board on which a control module and a power module of the machine are installed.

5. The machine according to claim 1, further comprising a Man-Machine interface integrated on the machine making it possible to program the torque of the motor or the clamping force of the clip.

6. The machine according to claim 1, wherein the electric motor is brushless.

7. A portable drilling and/or boring machine for workpieces, comprising:
- a jig bushing for guiding a machining tool;
- an expansible clip for blocking the jig bushing in an opening of a screen positioned on and secured to the workpiece, said screen constituting a drilling jig;
- means for moving the expansible clip in order to clamp and unclamp the jig bushing and secure the machine relative to the screen, the means for moving the expansible clip comprising an electric motor the torque and position of which are controlled;
    - a screw-nut system for converting the rotational movement of the shaft of the motor into a linear movement of the clamping expansible clip; and
    - damping springs at the nut, providing flexibility for the increasing torque on the motor during the clamping and unclamping phases.

8. The machine according to claim 1, further comprising at least one electronic board on which a control module and a power module of the machine are installed.

9. The machine according to claim 1, further comprising a Man-Machine interface integrated on the machine making it possible to program the torque of the motor or the clamping force of the clip.

10. The machine according to claim 1, wherein the electric motor is brushless.

* * * * *